(12) United States Patent
Masuda

(10) Patent No.: US 11,001,246 B2
(45) Date of Patent: May 11, 2021

(54) ELECTRIC BRAKE DEVICE

(71) Applicant: NTN CORPORATION, Osaka (JP)

(72) Inventor: Yui Masuda, Iwata (JP)

(73) Assignee: NTN CORPORATION, Osaka (JP)

( * ) Notice: Subject to any disclaimer, the term of this patent is extended or adjusted under 35 U.S.C. 154(b) by 0 days.

(21) Appl. No.: 16/365,204

(22) Filed: Mar. 26, 2019

(65) Prior Publication Data

US 2019/0217841 A1 Jul. 18, 2019

Related U.S. Application Data

(63) Continuation of application No. PCT/JP2017/034491, filed on Sep. 25, 2017.

(30) Foreign Application Priority Data

Sep. 28, 2016 (JP) .............................. JP2016-189956

(51) Int. Cl.
*B60T 13/74* (2006.01)
*B60T 17/20* (2006.01)
(Continued)

(52) U.S. Cl.
CPC ............ *B60T 13/741* (2013.01); *B60T 1/065* (2013.01); *B60T 8/00* (2013.01); *B60T 8/171* (2013.01);
(Continued)

(58) Field of Classification Search
CPC ...... B60T 13/588; B60T 13/74; B60T 13/741; B60T 8/171; B60T 8/172; B60T 8/175; B60T 17/20; H02P 27/04; H02H 7/08
(Continued)

(56) References Cited

U.S. PATENT DOCUMENTS 6,496,768 B2 12/2002 Yamamoto
8,833,869 B2 9/2014 Matsuzaki et al.
(Continued)

FOREIGN PATENT DOCUMENTS

CN 102050105 A 5/2011
CN 104736404 A 6/2015
(Continued)

OTHER PUBLICATIONS

English Translation by WIPO of the International Preliminary Report on Patentability dated Apr. 11, 2019 in corresponding International Patent Application No. PCT/JP2017/034491 (8 pages).
(Continued)

*Primary Examiner* — Christopher P Schwartz

(57) ABSTRACT

This electric brake device includes: a brake rotor, a friction member, a friction member operator, an electric motor, and a controller which controls, by controlling the electric motor, a braking force generated as a result of contact between the friction member and the brake rotor. The electric brake device includes a vehicle speed estimator which estimates the speed of the vehicle having the electric brake device mounted thereon. The controller includes a power limiter which limits the power that drives the electric motor. When an estimated vehicle speed, which is the speed of the vehicle estimated by the vehicle speed estimator, is in a determined low-speed range, the power limiter limits the power in accordance with a condition that has been determined such that the maximum power consumption of the electric brake device decreases in accordance with decrease in the estimated vehicle speed.

6 Claims, 9 Drawing Sheets

(51) Int. Cl.
*B60T 1/06* (2006.01)
*B60T 8/171* (2006.01)
*B60T 8/172* (2006.01)
*H02P 21/18* (2016.01)
*H02P 21/22* (2016.01)
*H02P 21/36* (2016.01)
*B60T 8/32* (2006.01)
*B60T 8/00* (2006.01)
*H02P 29/00* (2016.01)

(52) U.S. Cl.
CPC .............. *B60T 8/172* (2013.01); *B60T 8/321* (2013.01); *B60T 13/74* (2013.01); *B60T 17/20* (2013.01); *H02P 21/18* (2016.02); *H02P 21/22* (2016.02); *H02P 21/36* (2016.02); *H02P 29/00* (2013.01); *B60T 13/746* (2013.01); *B60T 2250/04* (2013.01)

(58) Field of Classification Search
USPC .................. 180/65.15, 65.21, 65.285, 65.31; 188/156–164; 303/3, 7, 15, 20, 152, 155; 318/400.04, 400.07, 400.12, 400.15, 318/400.3; 701/20–22, 70–72, 82
See application file for complete search history.

(56) References Cited

U.S. PATENT DOCUMENTS

| | | | |
|---|---|---|---|
| 9,605,722 B2 | 3/2017 | Saoyama et al. | |
| 9,915,308 B2* | 3/2018 | Masuda | F16D 55/225 |
| 9,994,204 B2 | 6/2018 | Yasui | |
| 2002/0026272 A1 | 2/2002 | Yamamoto | |
| 2006/0106521 A1* | 5/2006 | Nasr | B60T 8/175 701/82 |
| 2007/0085414 A1* | 4/2007 | Henry | B60T 13/741 303/3 |
| 2010/0253137 A1 | 10/2010 | Matsuzaki et al. | |
| 2014/0131150 A1* | 5/2014 | Nimura | B60W 10/188 188/158 |
| 2015/0105951 A1* | 4/2015 | Yu | B60L 58/14 701/22 |
| 2015/0175010 A1* | 6/2015 | Tang | H02H 7/08 701/22 |
| 2015/0219172 A1 | 8/2015 | Saoyama et al. | |
| 2015/0284005 A1* | 10/2015 | Suzuki | B60T 8/175 701/22 |
| 2015/0353128 A1* | 12/2015 | Shibuya | B62D 5/001 701/41 |
| 2016/0144739 A1* | 5/2016 | Ando | B60W 10/08 701/22 |
| 2016/0208871 A1 | 7/2016 | Masuda | |
| 2016/0297414 A1* | 10/2016 | Yasui | B60T 13/588 |
| 2017/0072931 A1 | 3/2017 | Masuda | |
| 2017/0113700 A1* | 4/2017 | Kaneko | B60W 30/18181 |
| 2017/0267122 A1* | 9/2017 | Mitsuoka | B60W 50/0097 |
| 2018/0086208 A1* | 3/2018 | Hodgson | B60L 3/104 |
| 2018/0244158 A1* | 8/2018 | Komatsu | B60L 7/26 |
| 2019/0338817 A1* | 11/2019 | Masuda | H02P 27/04 |

FOREIGN PATENT DOCUMENTS

| | | |
|---|---|---|
| CN | 105848976 A | 8/2016 |
| EP | 3 042 814 A1 | 7/2016 |
| EP | 3 088 265 A1 | 11/2016 |
| EP | 3 144 192 A1 | 3/2017 |
| JP | 2001-63537 | 3/2001 |
| JP | 2002-67906 | 3/2002 |
| JP | 2003-247576 | 9/2003 |
| JP | 2010-241171 | 10/2010 |
| JP | 2015-63152 | 4/2015 |
| JP | 2015-120416 | 7/2015 |
| WO | WO 2015/033863 A1 | 3/2015 |
| WO | WO 2015/174314 | 11/2015 |

OTHER PUBLICATIONS

International Search Report dated Dec. 26, 2017 in corresponding International Application No. PCT/JP2017/034491.
Office Action, dated Aug. 31, 2020, in corresponding Chinese Application No. 201780059594.5 (14 pp.).
Extended European Search Report, dated Mar. 9, 2020, in corresponding European Application No. 17856039.7 (9 pp.).
Notice of Reasons for Refusal, dated Jun. 16, 2020, in corresponding Japanese Application No. 2016-189956 (6 pp.).
Decision of Refusal dated Oct. 13, 2020, in Japanese Patent Application No. 2016-189956 with translation (5 pages total).

* cited by examiner

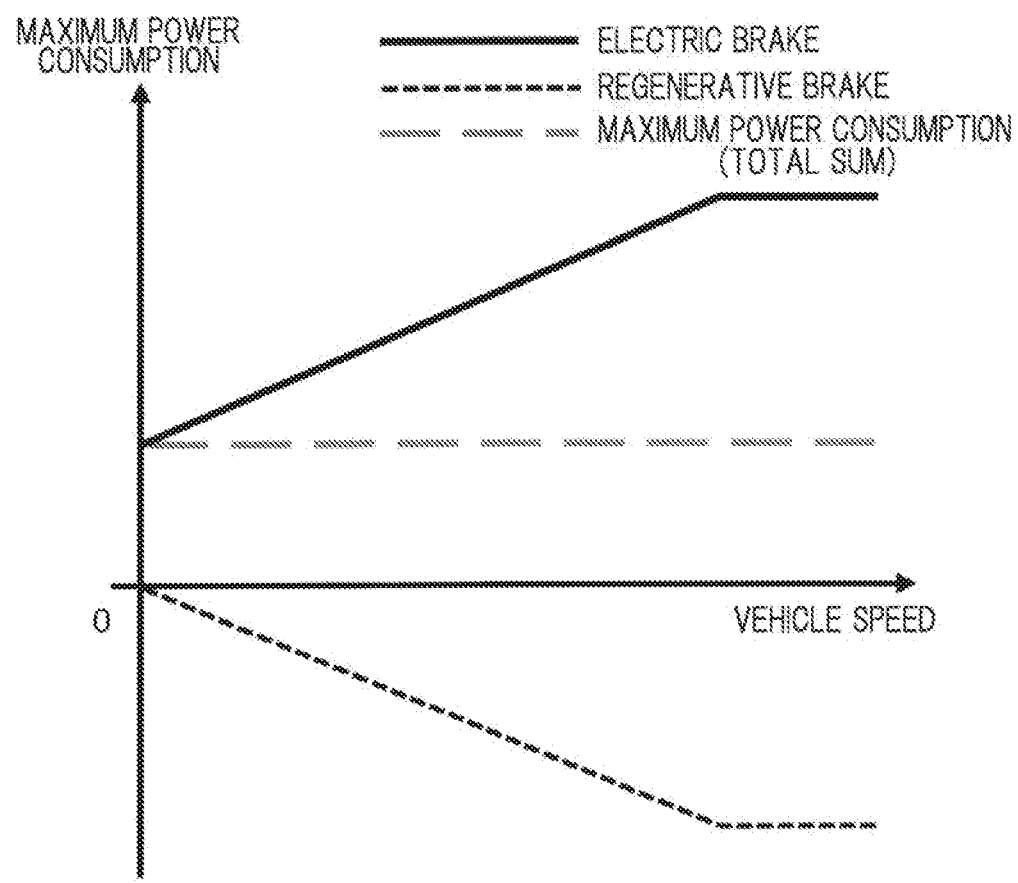

ELECTRIC BRAKE DEVICE

CROSS REFERENCE TO THE RELATED APPLICATION

This application is a continuation application, under 35 U.S.C. § 111(a), of international application No. PCT/JP2017/034491, filed Sep. 25, 2017, which is based on and claims Convention priority to Japanese patent application No. 2016-189956, filed Sep. 28, 2016, the entire disclosure of which is herein incorporated by reference as a part of this application.

BACKGROUND OF THE INVENTION

Field of the Invention

The present invention relates to an electric brake device that can suppress power consumption.

Description of Related Art

As an electric brake device, the following technology has been proposed. According to the technology, the rotary drive force of an electric motor is reduced by a speed reducer or reduction gear, and the resultant rotary drive force is converted into a linear motion via a linear motion mechanism (advancing/retracting operation mechanism), whereby a friction pad is pressed to be in contact with a disc rotor to apply a braking force (Patent Document 1).

RELATED DOCUMENT

Patent Document

[Patent Document 1] JP Laid-open Patent Publication No. 2003-247576

For example, in the electric brake device using an electric actuator as in Patent Document 1, the steady power consumption in an ordinary brake operation is substantially only the motor copper loss (about several Ws to several tens of Ws per wheel), and thus, shortage of the power supply capacity of a vehicle is very unlikely to occur. Meanwhile, mainly when an anti-lock brake system (abbreviated as: ABS) is used or sudden braking is applied, a quick brake response is required in many cases. The instantaneous power consumption at this time could be several hundreds of Ws or greater per wheel, which could cause shortage of the power supply capacity of the vehicle.

At the same time, when the vehicle speed becomes slower, shortage of the power supply capacity of the vehicle more easily occurs accordingly in many cases. For example, in the case of a regenerative brake or an alternator, basically, if influence of transmission is excluded, when the speed becomes lower, the regenerative energy per unit torque accordingly decreases. Meanwhile, for example, in the case of electric steering, in general, there is a tendency that when the speed becomes lower, more assist force is accordingly required for steering a wheel, and thus, power consumption increases. For these reasons, especially, when the speed of the vehicle is lower, shortage of the power supply capacity of the vehicle could occur more easily.

SUMMARY OF THE INVENTION

An object of the present invention is to provide an electric brake device that can prevent shortage of the power supply capacity of a vehicle.

Hereinafter, in order to facilitate understanding of the present invention, the present invention will be described with reference to the reference numerals in embodiments for the sake of convenience.

An electric brake device of the present invention includes:
an electric actuator 1 and a controller 2,
the electric actuator 1 including
a brake rotor 8,
a friction member 9 to be brought into contact with the brake rotor 8,
a friction member operator 6 configured to bring the friction member 9 into contact with the brake rotor 8, and
an electric motor 4 configured to drive the friction member operator 6,
the controller 2 being configured to control, by controlling the electric motor 4, a braking force generated as a result of the contact between the friction member 9 and the brake rotor 8, wherein
the electric brake device comprises a vehicle speed estimator 30 configured to estimate a speed of a vehicle having the electric brake device mounted thereon,
the controller 2 includes a power limiter 26 (26A) configured to limit a power that drives the electric motor 4, and
when an estimated vehicle speed, which is the speed of the vehicle estimated by the vehicle speed estimator 30, is in a determined low-speed range, the power limiter 26 (26A) limits the power in accordance with a condition that has been determined such that a maximum power consumption of the electric brake device decreases in accordance with decrease in the estimated vehicle speed.

The determined low-speed range is arbitrarily determined by a design or the like, and is determined by obtaining an appropriate low-speed range by either one or both of tests and simulation, for example.

The determined condition is arbitrarily determined by a design or the like, and is determined by obtaining an appropriate condition by either one or both of tests and simulation, for example.

In general, in electric steering where a large power is consumed, as one of the on-vehicle auxiliary apparatuses, when the speed of the vehicle becomes lower, more assist force is accordingly required for steering, and thus, the power consumption increases. Meanwhile, in general, in the case of a regenerative brake or an alternator which can supply power to a vehicle, when the absolute value of the vehicle speed becomes smaller, the power generation amount accordingly decreases. Thus, in general, there is a tendency that when the absolute value of the vehicle speed becomes smaller, the power of the power supply of the vehicle is accordingly consumed more. Therefore, it is rational to limit the power that drives an electric motor of the electric brake device, in accordance with decrease in the absolute value of the vehicle speed. In addition, when the absolute value of the vehicle speed becomes smaller, the influence of increase and the like of the braking distance of the vehicle due to decrease of the brake performance is accordingly reduced. Also from this aspect, it is rational to limit the power for the electric motor of the electric brake device.

According to this configuration, the controller 2 controls the braking force by controlling the electric motor 4. The braking force is generated as a result of the contact between the friction member 9 and the brake rotor 8. The vehicle speed estimator 30 estimates the speed of the vehicle. The power limiter 26 (26A) limits the power in accordance with a condition that has been determined such that, in a low-speed range, the maximum power consumption of the electric brake device decreases in accordance with decrease in the estimated vehicle speed. By limiting the power in this manner, it is possible to prevent shortage of the power supply capacity due to power consumption by the electric brake device, in a low-speed range where shortage of the power supply capacity of the vehicle easily occurs. In addition, by limiting the maximum power consumption of the electric brake device so as to decrease in the low-speed range, it is possible to suppress decrease of braking performance in a medium and high speed ranges.

The controller 2 may include an angular velocity estimator 28 configured to estimate an angular velocity of a rotor of the electric motor 4, and the controller 2 has a function of determining, when controlling the braking force, a torque to be outputted by the electric motor 4 or a value corresponding to the torque, and in accordance with the estimated vehicle speed, the power limiter 26 may change a limitation value for the torque or the value corresponding to the torque at a determined estimated angular velocity among angular velocities estimated by the angular velocity estimator 28.

The determined estimated angular velocity is arbitrarily determined by a design or the like, and is determined by obtaining an appropriate estimated angular velocity by either one or both of tests and simulation, for example.

The power required for outputting a predetermined torque at a determined estimated angular velocity can be known in advance through simulation or experiments. Therefore, by limiting the torque or the value corresponding to the torque, it is possible to limit the power that drives the electric motor.

The electric brake device may include a plurality of the electric actuators 1, the controller 2 may control the plurality of the electric actuators 1, and the power limiter 26 may change a limitation value for a total sum of the torques outputted by the electric motors 4 or of the values corresponding to the torques.

With this configuration, in such a case where any of the plurality of the electric actuators 1 does not need a large power, or in such a case where any of the plurality of the electric actuators 1 generates regenerative power, the other electric actuators 1 are allowed to operate without limiting the torque command value, and the responsiveness of the electric brake device can be exerted to the maximum extent.

The controller 2 may have a function of determining, when controlling the braking force, a voltage that controls a current of the electric motor 4 to a desired value, and the power limiter 26A may determine the voltage such that a power derived from the current and the voltage or a value corresponding to the power does not exceed a determined limit value.

The determined limit value is arbitrarily determined by a design or the like, and is determined by obtaining an appropriate limit value by either one or both of tests and simulation, for example.

In this case, the calculation load can be reduced, and the control system can be simplified.

The electric brake device may include a plurality of the electric actuators 1, the controller 2 may control the plurality of the electric actuators 1, and the power limiter 26A may change a limitation value for a total sum of the powers derived from the currents and the voltages or of the values corresponding to the powers.

With this configuration, in such a case where any of the plurality of the electric actuators 1 does not need a large power, or in such a case where any of the plurality of the electric actuators 1 generates regenerative power, the other electric actuators 1 are allowed to operate without limiting the torque command value, and the responsiveness of the electric brake device can be exerted to the maximum extent.

The power limiter 26 (26A) may limit the power only when the electric motor 4 performs power-running operation. Since the drive power when the electric motor 4 performs regenerative operation is charged in a battery, a capacitor, or the like of the vehicle, shortage of the power supply capacity of the vehicle is not caused. Therefore, if the power limiter 26A limits the power only when the electric motor 4 performs power-running operation, the responsiveness of the electric brake device can be exerted to the maximum extent.

Any combination of at least two constructions, disclosed in the appended claims and/or the specification and/or the accompanying drawings should be construed as included within the scope of the present invention. In particular, any combination of two or more of the appended claims should be equally construed as included within the scope of the present invention.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

FIG. 8B is a graph for comparing the maximum power consumption of the vehicle provided with the power limiter of the electric brake device;

DESCRIPTION OF EMBODIMENTS

Figure 1:
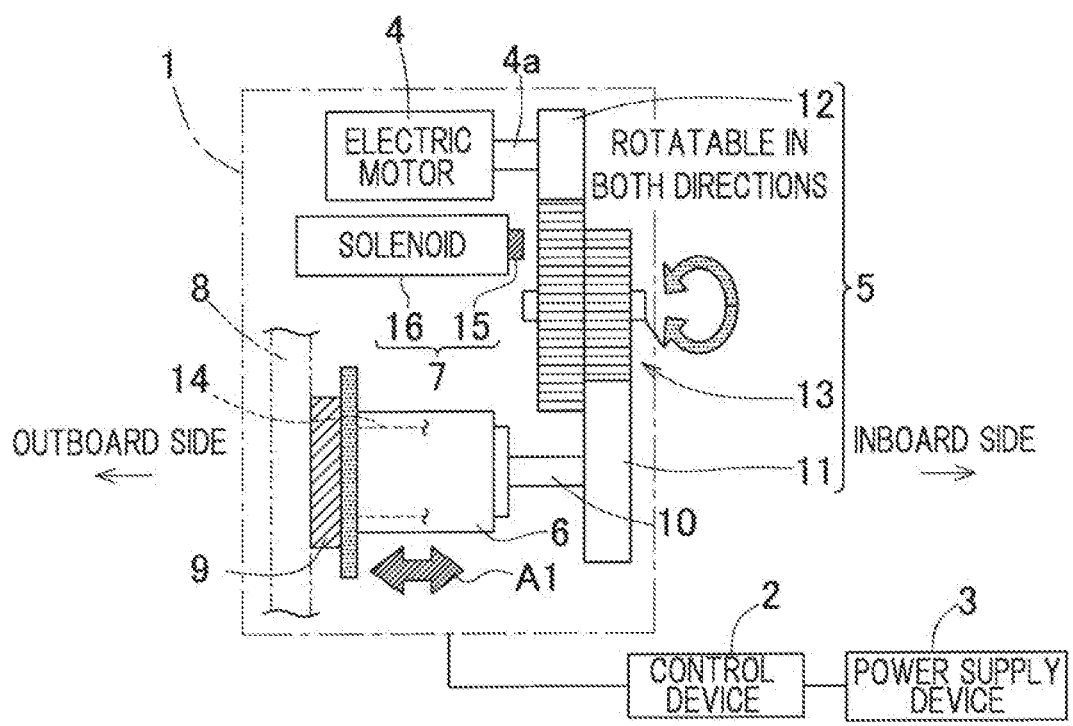
FIG. 1 is a schematic front view of an electric brake device according to one embodiment of the present invention.

An electric brake device according to one embodiment of the present invention will be described with reference to FIG. 1 to FIG. 5B. This electric brake device is mounted to a vehicle, for example. As shown in FIG. 1, the electric brake device includes an electric actuator 1, a controller 2, and a power supplier 3. First, the electric actuator 1 is described.

The electric actuator 1 includes an electric motor 4, a speed reduction mechanism 5, a friction member operator or friction member operation mechanism 6, a parking brake mechanism 7, a brake rotor 8, and a friction member 9. The electric motor 4, the speed reduction mechanism 5, and the friction member operator 6 are incorporated in a housing or the like (not shown), for example. The electric motor 4 is implemented as a three-phase synchronous motor or the like. The brake rotor 8 is mounted to a wheel (not shown), and rotates integrally with the wheel.

The speed reduction mechanism 5 reduces the speed of rotation, or the number of rotation per unit time, of the electric motor 4, and includes a primary gear 12, an intermediate (secondary) gear 13, and a tertiary gear 11. In this example, the speed reduction mechanism 5 can reduce the speed of rotation of the primary gear 12 mounted to a rotor shaft 4a of the electric motor 4, by an intermediate gear 13 composed of integrally-formed coaxial large and small gears, for example, and transmit the resultant rotation to a tertiary gear 11 fixed to an end portion of a rotational shaft 10.

A linear motion mechanism is applied as the friction member operator 6. The linear motion mechanism as the friction member operator 6 converts the rotary motion outputted from the speed reduction mechanism 5, into linear motion of a linear motion portion 14 by a feed screw mechanism, thereby bringing the friction member 9 into contact with the brake rotor 8 or separating the friction member 9 from the brake rotor 8. The linear motion portion 14 is supported in such a manner as to be prevented from rotating and as to be movable in an axial direction indicated by an arrow A1. The friction member 9 is provided at the outboard-side end of the linear motion portion 14. Rotation of the electric motor 4 is transmitted to the friction member operator 6, through the speed reduction mechanism 5, whereby the rotary motion of the electric motor 4 is converted into linear motion of the linear motion portion 14, the linear motion is converted into a pressing force of the friction member 9, and a braking force is thereby generated. It should be noted that, in a state where the electric brake device is mounted to a vehicle, the outer side in the vehicle width direction of the vehicle is referred to as outboard side, and the center side in the vehicle width direction of the vehicle is referred to as inboard side.

For example, a linear solenoid is used as an actuator 16 of the parking brake mechanism 7. The actuator 16 causes a lock member 15 to advance to be fitted into and engaged with a locking hole (not shown) formed in the intermediate gear 13, thereby preventing rotation of the intermediate gear 13. Accordingly, a parking lock state is realized. When the lock member 15 is disengaged from the locking hole to allow rotation of the intermediate gear 13, an unlock state is realized.

Figure 2:
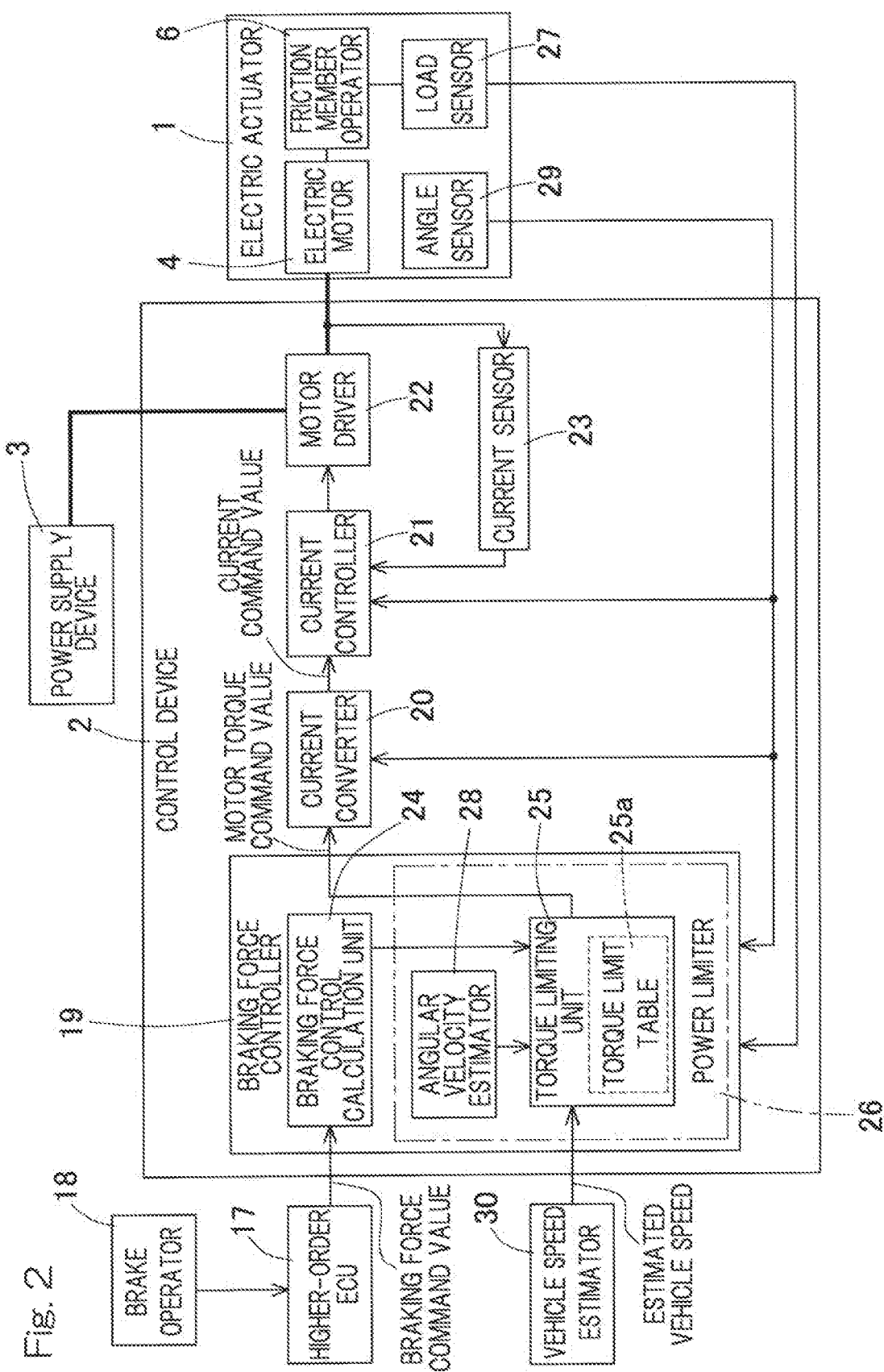
FIG. 2 is a block diagram of a control system of the electric brake device.

The controller 2 and the power supplier 3 are connected to the electric actuator 1. FIG. 2 is a block diagram of a control system for this electric brake device. For example, each wheel is provided with a corresponding controller 2 and a corresponding electric actuator 1. Each controller 2 has connected to the power supplier 3 and a higher-order ECU 17, which is a higher-order control unit for the controller 2. A vehicle control unit (VCU) which performs general control of the vehicle is used as the higher-order ECU 17, for example. The higher-order ECU 17 has an integrated control function for each controller 2.

The power supplier 3 supplies power to the electric motor 4 and the controller 2. The higher-order ECU 17 outputs a braking force command value to each controller 2 in accordance with a sensor output which changes in accordance with a manipulation amount of a brake operator or brake operation mechanism 18. As the brake operator 18, a brake pedal or the like may be used, for example, but another operator such as a joy stick may be used.

Each controller 2 includes a braking force controller 19, a current converter 20, a current controller 21, a motor driver 22, and a current sensor 23. The braking force controller 19 includes a braking force control calculation unit 24, and a power limiter 26 which includes a torque limiting unit 25 and an angular velocity estimator 28. The braking force control calculation unit 24 performs control calculation of a command value for attaining a braking force command value provided from the higher-order ECU 17.

For example, the braking force controller 19 converts the braking force command value into an actuator load, which is the load of the electric actuator 1, and performs load feedback control of causing an output load, which is a sensor output from a load sensor 27, to be controlled to follow the actuator load. Accordingly, high accuracy braking force control can be easily realized. The braking force controller 19 may use motor angle feedback control, angular velocity feedback control, or the like as appropriate, in addition to the load feedback control. Eventually, the braking force control calculation unit 24 obtains a motor torque command value necessary for the braking force control.

The load sensor 27 is used in order to control the pressing force, as the braking force, between the friction member 9 (FIG. 1) and the brake rotor 8 (FIG. 1). As the load sensor 27, a magnetic sensor, a strain sensor, a pressure sensor, or the like that detects displacement can be used, for example. It is also possible to estimate the braking force, without using the load sensor 27, on the basis of current, motor angle, actuator rigidity, torque-thrust characteristics, or the like. Alternatively, it is also possible to use a sensor or the like that detects the wheel torque or front-rear forces of the wheel having this electric brake device mounted thereon, as the braking force, instead of the above-described load.

The torque limiting unit 25 has a function of limiting the torque of the electric motor 4 in accordance with the angular velocity of the rotor of the electric motor 4, the vehicle speed, and the like. The angular velocity estimator 28 estimates the angular velocity by performing differentiation on the motor angle detected by an angle sensor 29, for example. As the angle sensor 29, for example, if a resolver, a magnetic encoder, or the like is used, high accuracy and high reliability are realized, and thus, such a configuration is preferable. However, various types of sensors such as an optical encoder can also be used. Alternatively, without using the angle sensor 29, the angular velocity estimator 28 may estimate the motor angle on the basis of a relationship between motor voltage and motor current, or the like.

The vehicle speed is estimated by a vehicle speed estimator 30. The vehicle speed estimator 30 can estimate the vehicle speed using a wheel speed sensor, an acceleration sensor, an attitude sensor, or the like (each not shown) of the vehicle, for example. When an estimated vehicle speed, which is the speed of the vehicle estimated by the vehicle speed estimator 30, is in a determined low-speed range, the torque limiting unit 25 exerts the limiting function by changing the limitation value (limit torque) for the motor torque command value at a determined estimated angular velocity among angular velocities estimated by the angular velocity estimator 28.

The power required for outputting a predetermined torque at the determined estimated angular velocity can be known in advance through simulation or experiments. Therefore, by limiting the motor torque command value, it is possible to limit the power that drives the electric motor. A compensation operation or the like at the time when the motor torque derived by the braking force control calculation unit 24 is limited by the torque limiting unit 25 may be separately provided to the braking force control calculation unit 24.

Figure 3:
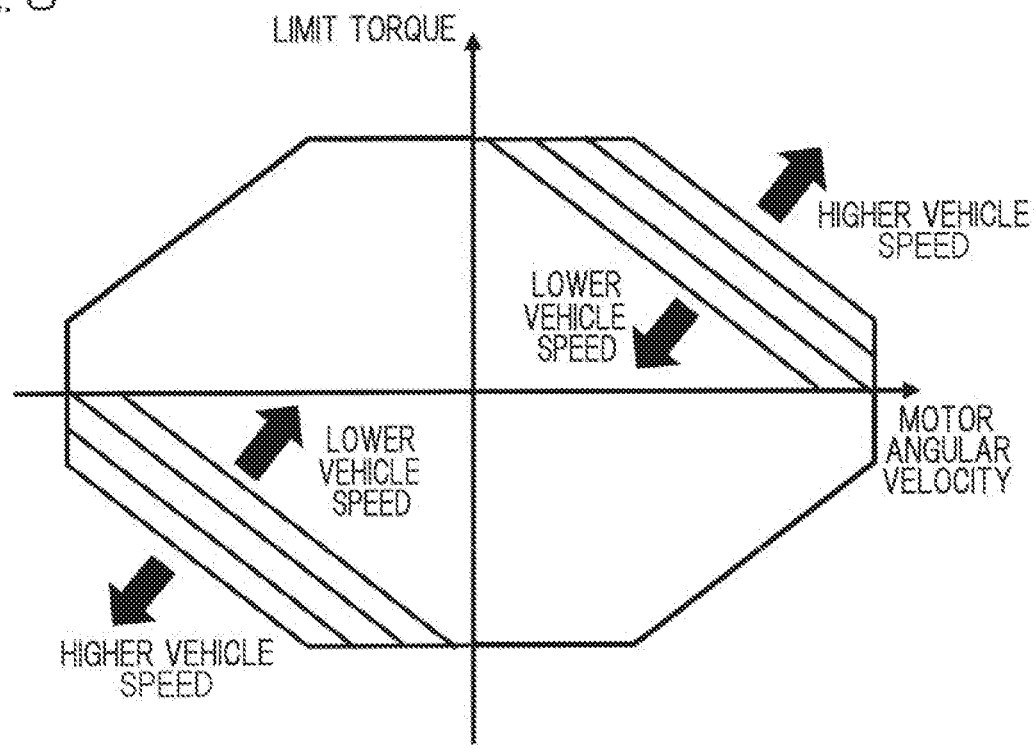
FIG. 3 is a graph showing an example illustrating how the torque is limited in the electric brake device.

FIG. 3 is a diagram showing an example illustrating how the torque is limited in this electric brake device. The first and third quadrants in FIG. 3 are each a region where the electric motor performs power-running operation, and the second and fourth quadrants are each a region where the electric motor performs regenerative operation. The torque limiting unit 25 shown in FIG. 2 and FIG. 3 performs a process in which, when the absolute value of the estimated vehicle speed becomes small, the limit torque according to the motor angular velocity becomes small, for example. In general, there is a tendency that, when the absolute value of the vehicle speed becomes smaller, the power of the power supply of the vehicle is accordingly consumed more. Therefore, it is rational to limit the power that drives the electric motor of the electric brake device, in accordance with decrease in the absolute value of the vehicle speed. In addition, when the absolute value of the vehicle speed becomes smaller, the influence of increase and the like of the braking distance of the vehicle due to decrease of the brake performance is accordingly reduced. Also from this aspect, it is rational to limit the power that drives the electric motor of the electric brake device.

The process in which, when the absolute value of the vehicle speed becomes small, the limit torque according to the motor angular velocity becomes small, may be applied only when the vehicle is traveling forward, but the minimum limit value for forward traveling may be applied, when the vehicle is traveling backward, for example. In general, the vehicle speed when a vehicle is traveling backward is often very low compared with that when the vehicle is traveling forward. Therefore, there is no problem if the limiting process described above is applied only during forward traveling where a high speed traveling state could occur.

For limiting the torque in the torque limiting unit 25, a torque limit table 25*a* (FIG. 2) for obtaining a limit torque in accordance with a motor angular velocity and a vehicle speed may be used. If a look-up table (abbreviated as: LUT) or the like is used as the torque limit table 25*a*, calculation time can be shortened, and thus, such a configuration is preferable. At this time, it is preferable to perform a process of interpolating the intermediate value between breakpoints (for example, components or elements contained in the LUT) in the LUT using a predetermined function, but it is also possible to employ a process of determining a limit value for each breakpoint without performing interpolation in order to reduce the calculation load. Other than this, without using the LUT described above, it is possible to employ a process of calculating a limit torque by use of a predetermined function which obtains them using the motor angular velocity or the vehicle speed as a variable.

The current converter 20 in FIG. 2 has a function of converting the motor torque command value, inputted from the braking force controller 19, into a current command value, which corresponds to a control current that causes the electric motor to output a predetermined command torque according to the motor angular velocity. The control current may be a d-axis or q-axis current, for example.

If the current controller 21 performs current feedback control of causing the motor current estimated by the current sensor 23 to be controlled to follow the current command value from the current converter 20, high accuracy torque output can be realized, and such a configuration is preferable. Alternatively, feedforward control may be performed on the basis of electromagnetic characteristics or the like of the electric motor 4, or the current feedback control and the feedforward control may be used in combination. Still alternatively, an equation of motion in the braking force controller 19 and the electromagnetic characteristics of the electric motor 4 may be integrated to form one control calculation loop having the functions of the braking force controller 19, the current converter 20, the current controller 21, and the like.

Each of the braking force controller 19, the current converter 20, and the current controller 21 described above is specifically configured with a hardware circuit or a software function on a processor (not shown) which enables calculation and output of a result thereof, with use of a LUT (Look Up Table) implemented by software or hardware, or a prescribed transform function contained in a library of software or hardware equivalent thereto, and, as necessary, a comparison function or a four arithmetic operation function in the library or hardware equivalent thereto, etc. That is, each function of the braking force controller 19, the current converter 20, and the current controller 21 described above is preferably implemented by a computing unit such as a microcomputer, an FPGA, a DSP, or the like. Accordingly, an inexpensive and high-performance configuration is preferably realized.

As the current sensor 23, a non-contact type that detects the magnetic field of the electric line may be used, or a method may be employed in which a shunt resistor or the like is provided to the electric line and detection is performed on the basis of the voltage across their opposite ends. At this time, as shown in FIG. 2, the current sensor 23 may be provided to the electric line at the secondary side, or may be provided to the electric line at the primary side so as to estimate the secondary-side current of the electric line at the secondary side. As the current sensor 23, a technology may be employed in which detection is performed on the basis of the voltage or the like at a predetermined position of the motor driver 22. In the current detection, currents of two phases may be detected and the remaining one phase current may be estimated using the relationship that the total sum of currents of three phases becomes zero, or currents of all three phases may be detected.

The motor driver 22 may be configured such that: for example, a half-bridge circuit using a switching element such as an FFT is configured; and PWM control is performed in which the voltage applied to the motor is determined on the basis of a predetermined duty ratio regarding the voltage applied to the switching element. Thus, inexpensive and high performance configuration is realized, and such a configuration is preferable. Alternatively, PAM control may be performed with a transformation circuit or the like provided.

Figure 4:
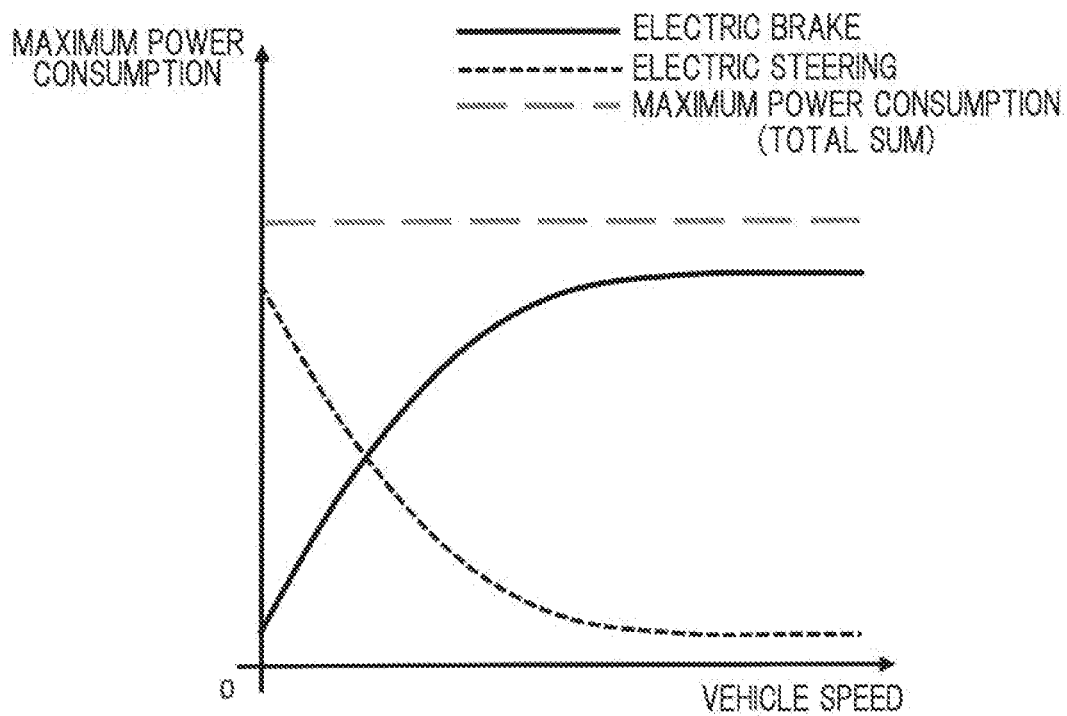
FIG. 4 is a graph showing the relationship between vehicle speed and maximum power consumption in a vehicle provided with the electric brake device and electric steering.
Figure 5A:
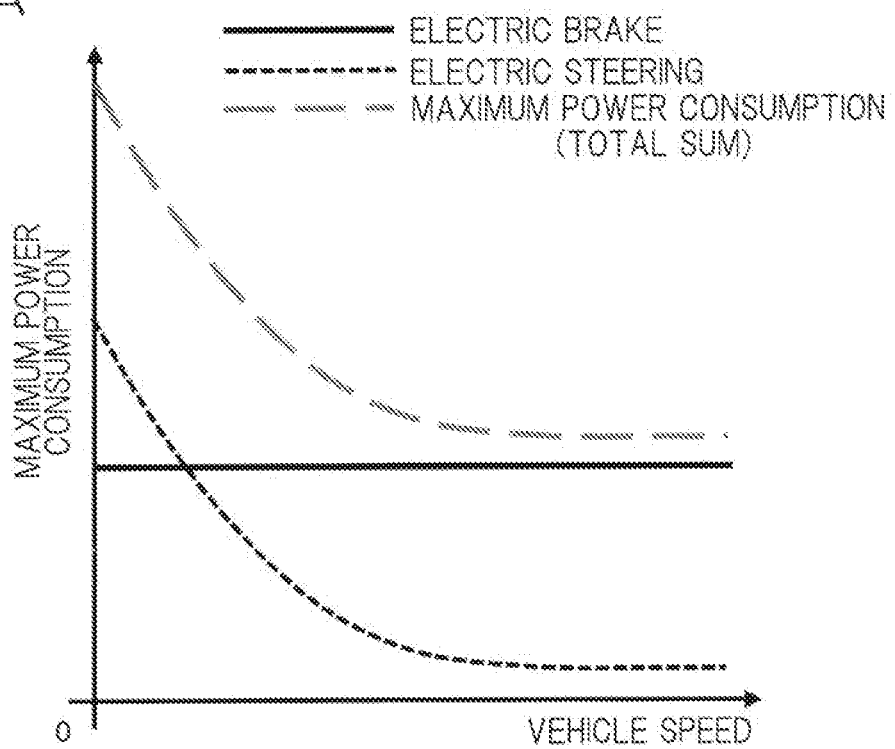
FIG. 5A is a graph for comparing the maximum power consumption of the vehicle not provided with a power limiter of the electric brake device.
Figure 5B:
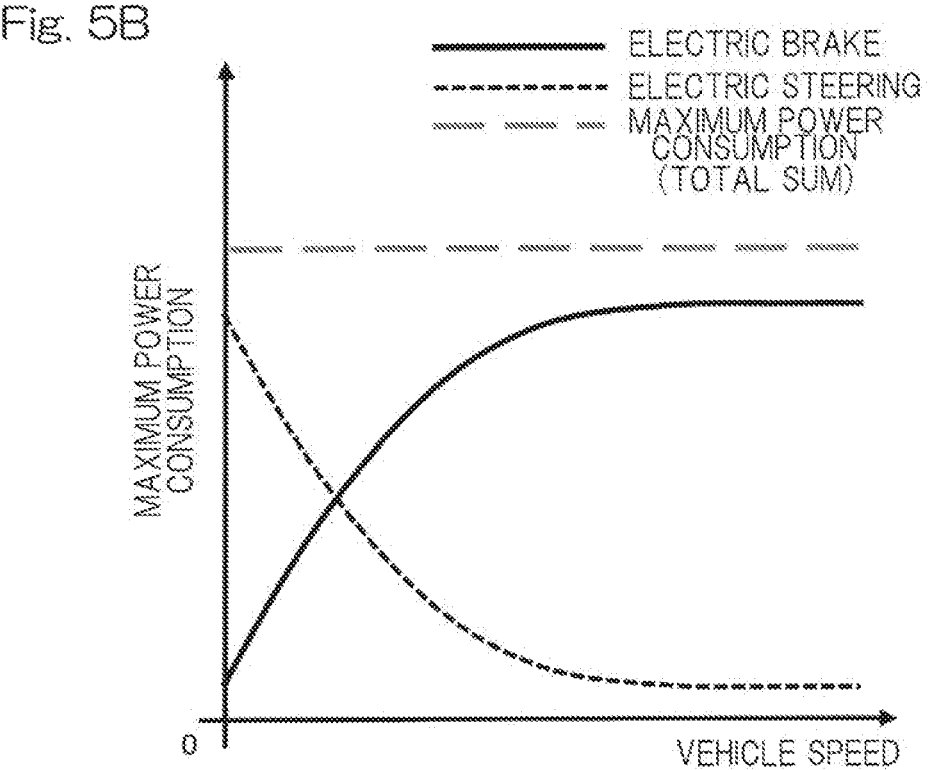
FIG. 5B is a graph for comparing the maximum power consumption of the vehicle provided with the power limiter of the electric brake device.

FIG. 4 is a diagram showing a relationship between vehicle speed and maximum power consumption in a vehicle provided with the electric brake device and electric steering. For simplification, description is given, with the influences of other electrical equipment systems excluded. The same also applies to FIG. 5A and FIG. 5B. FIG. 5B is a diagram showing maximum power consumption of a vehicle provided with the power limiter of the electric brake device, and FIG. 5A is a diagram showing maximum power consumption of a vehicle not provided with the power limiter. Comparison is performed between FIG. 5A and FIG. 5B.

FIG. 5A shows a conventional example in which the maximum power consumption of the electric brake device is constant. In general, the power consumption in electric steering has a tendency that, when the speed is in a lower speed range where more assist force is required, the maximum power consumption accordingly increases. Therefore, when the speed is in a lower speed range, the maximum power consumption of a vehicle having the electric brake device and electric steering also accordingly increases. That is, the power supply capacity of the vehicle needs to be a power supply capacity that can output the maximum power consumption near the zero speed where the total sum of the maximum power consumptions peaks.

In contrast, in the system configuration example of the present embodiment shown in FIG. 5B, a process is performed in which, when the vehicle speed becomes slow, the maximum power consumption of the electric brake device is reduced. In the example shown in FIG. 5B, the power that drives the electric motor is limited such that, when the vehicle speed decreases, the maximum power consumption of the electric brake device accordingly decreases. Thus, when compared with the conventional example shown in FIG. 5A, the total sum of the maximum power consumptions is substantially uniform in the entire vehicle speed range. Accordingly, the power supply capacity of the vehicle can be reduced, or the responsiveness of the electric brake device is improved in a high speed range where the importance of responsiveness of the electric brake device increases, or operations and effects of both can be obtained.

According to the electric brake device described above, the power limiter 26 limits the power such that, when the estimated vehicle speed decreases in a low-speed range, the maximum power consumption of the electric brake device accordingly decreases. By limiting the power in this manner, it is possible to prevent shortage of the power supply capacity due to power consumption by the electric brake device, in a low-speed range where shortage of the power supply capacity of the vehicle easily occurs. In addition, by limiting the maximum power consumption of the electric brake device so as to decrease in the low-speed range, it is possible to suppress decrease of braking performance in a medium and high speed ranges.

Other embodiments will be described. In the following description, the components corresponding to the matters described in the preceding embodiment are denoted by like reference numerals, and repeated description is not given. When only a part of a configuration is described, the other part of the configuration is the same as described in the preceding description unless otherwise specified. The same operation and effect can be obtained from the same configuration. A combination of parts that are specifically described in the embodiments can be implemented, and further, the embodiments may be partially combined unless such combinations cause any problem.

Figure 6:
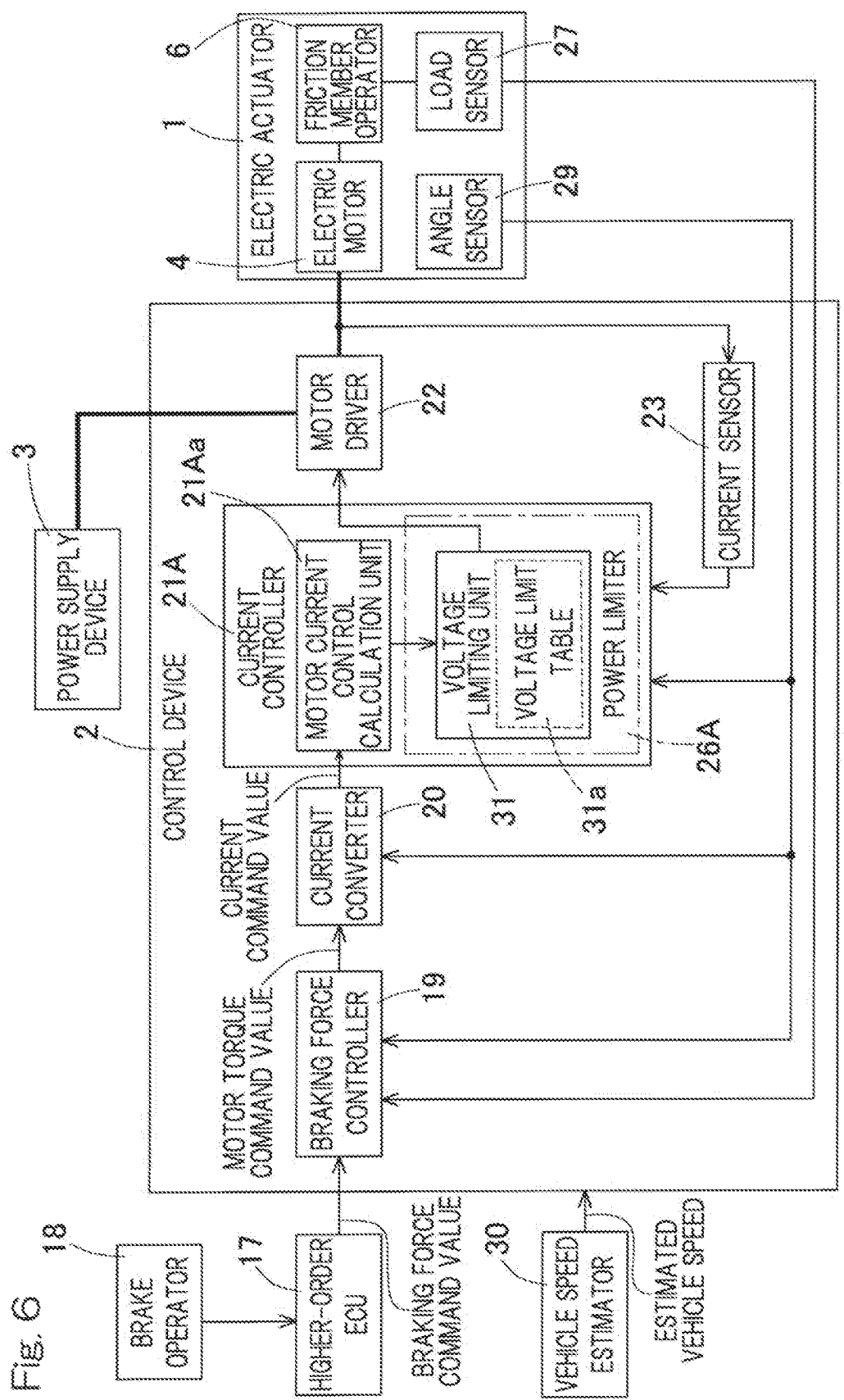
FIG. 6 is a block diagram showing a control system of an electric brake device according to another embodiment of the present invention.

As shown in FIG. 6, a configuration may be employed in which a power limiter 26A, which limits the power that drives the electric motor 4, includes a voltage limiting unit 31 which limits the motor drive voltage. A current controller 21A in this example has a motor current control calculation unit 21Aa and the power limiter 26A. The motor current control calculation unit 21Aa has a function similar to that of the current controller 21 shown in FIG. 2.

Figure 7:
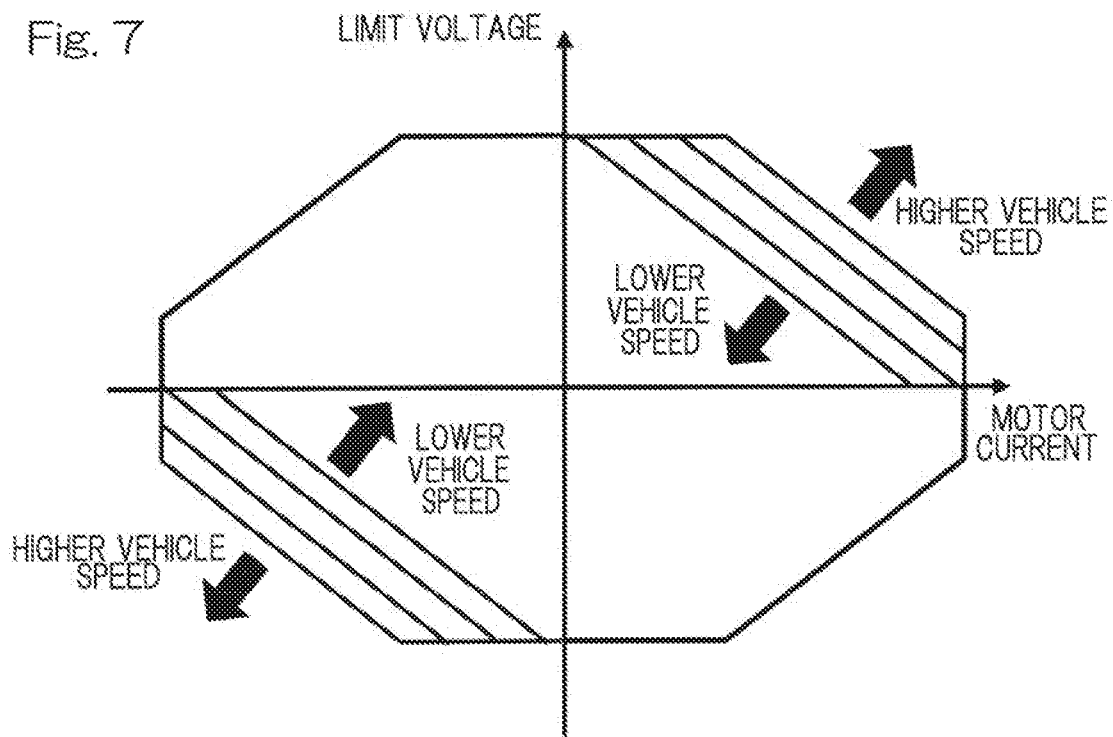
FIG. 7 is a graph showing an example illustrating how the motor voltage is limited in the electric brake device.

FIG. 7 is a diagram showing an example illustrating how the motor voltage is limited in this electric brake device, and corresponds to FIG. 3. The first and third quadrants in FIG. 7 are each a region where the electric motor performs power-running operation, and the second and fourth quadrants are each a region where the electric motor performs regenerative operation. As shown in FIG. 6 and FIG. 7, the voltage limiting unit 31 has a function of limiting the voltage outputted from the motor driver 22, in accordance with the motor current, the vehicle speed, and the like. The motor current is estimated by the current sensor 23, or the like. The vehicle speed is estimated by the vehicle speed estimator 30.

For limiting the voltage, if the voltage limiting unit 31 is configured to have a function of limiting the output voltage in accordance with the feedback current, a simple configuration is realized. Accordingly, for example, a voltage limit table 31a for obtaining a limit voltage in accordance with a feedback current or a vehicle speed can be used. If a look-up table (LUT) or the like is used as the voltage limit table 31a, calculation load can be reduced, and such a configuration is preferable. Other than this, as for the voltage limiting unit 31, for limiting the voltage, a look-up table (LUT) for obtaining a limit power in accordance with a vehicle speed may be provided, and a value obtained by dividing the limit power by the feedback current may be used as the limit voltage, for example.

Figure 8A:
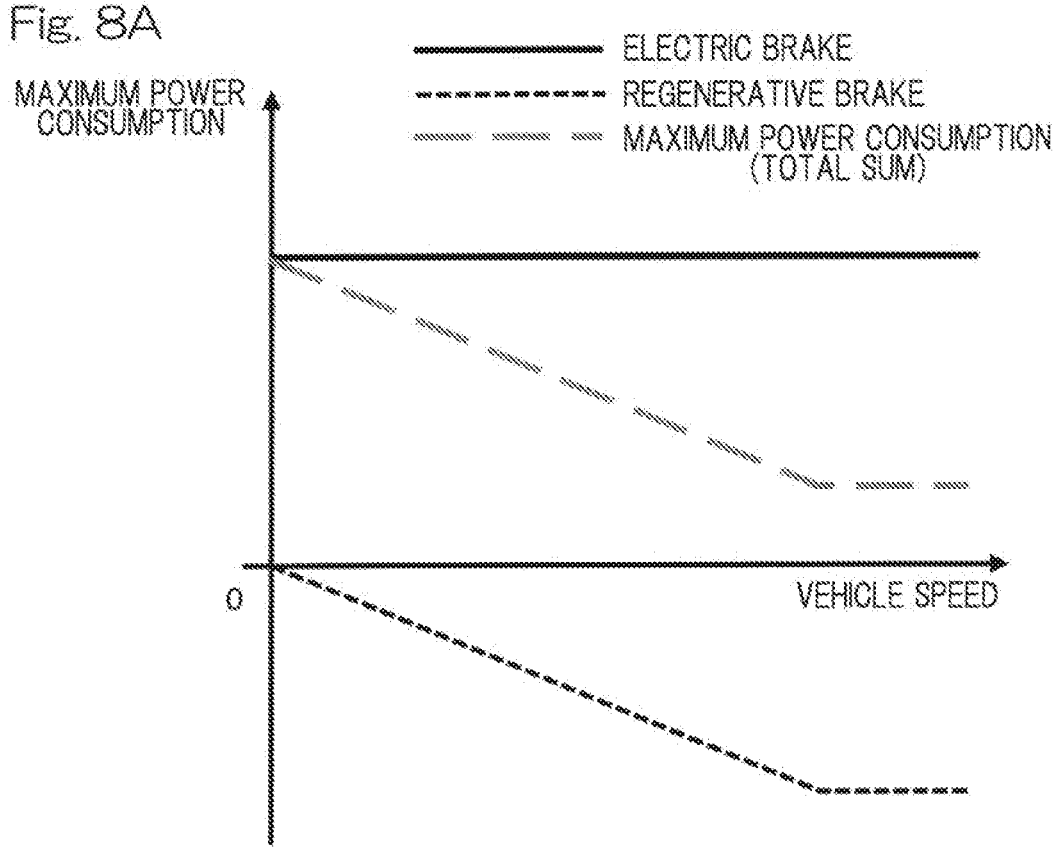
FIG. 8A is a graph for comparing the maximum power consumption of the vehicle not provided with a power limiter of the electric brake device.

FIG. 8A and FIG. 8B are each a diagram for comparison indicating the relationship between vehicle speed and maximum power consumption in a vehicle provided with the electric brake device and a regenerative brake, and correspond to FIG. 5A and FIG. 5B, respectively. For simplification, description is given, with the influences of other electrical equipment systems excluded. Since the power of the regenerative brake is charged in a battery or the like, the maximum power consumption indicates the negative direction (i.e. opposite direction) in FIG. 8A and FIG. 8B. For example, as for an alternator, although there is a difference in that the power generation amount does not become "zero" at the vehicle speed "zero", the alternator has a tendency that is substantially the same as that of a regenerative brake.

FIG. 8A shows a conventional example in which the maximum power consumption of the electric brake device is constant. In general, when the vehicle speed increases, the power that can be regenerated by the regenerative brake accordingly increases. Therefore, when the speed is in a lower speed range, the maximum power consumption of the vehicle having the electric brake device and the regenerative brake also accordingly increases.

In contrast, in the system configuration example of the present embodiment shown in FIG. 8B, a process is performed in which, when the vehicle speed becomes slow, the maximum power consumption of the electric brake device is reduced. In the example shown in FIG. 8B, the power that drives the electric motor is limited such that, when the vehicle speed decreases, the maximum power consumption of the electric brake device accordingly decreases. Thus, when compared with the conventional example shown in FIG. 8A, the total sum of the maximum power consumptions is substantially uniform in the entire vehicle speed range.

Accordingly, the power supply capacity of the vehicle can be reduced, or the responsiveness of the electric brake device is improved in a high speed range where the importance of responsiveness of the electric brake device increases, or operations and effects of both can be obtained.

[Modification]

Figure 9:
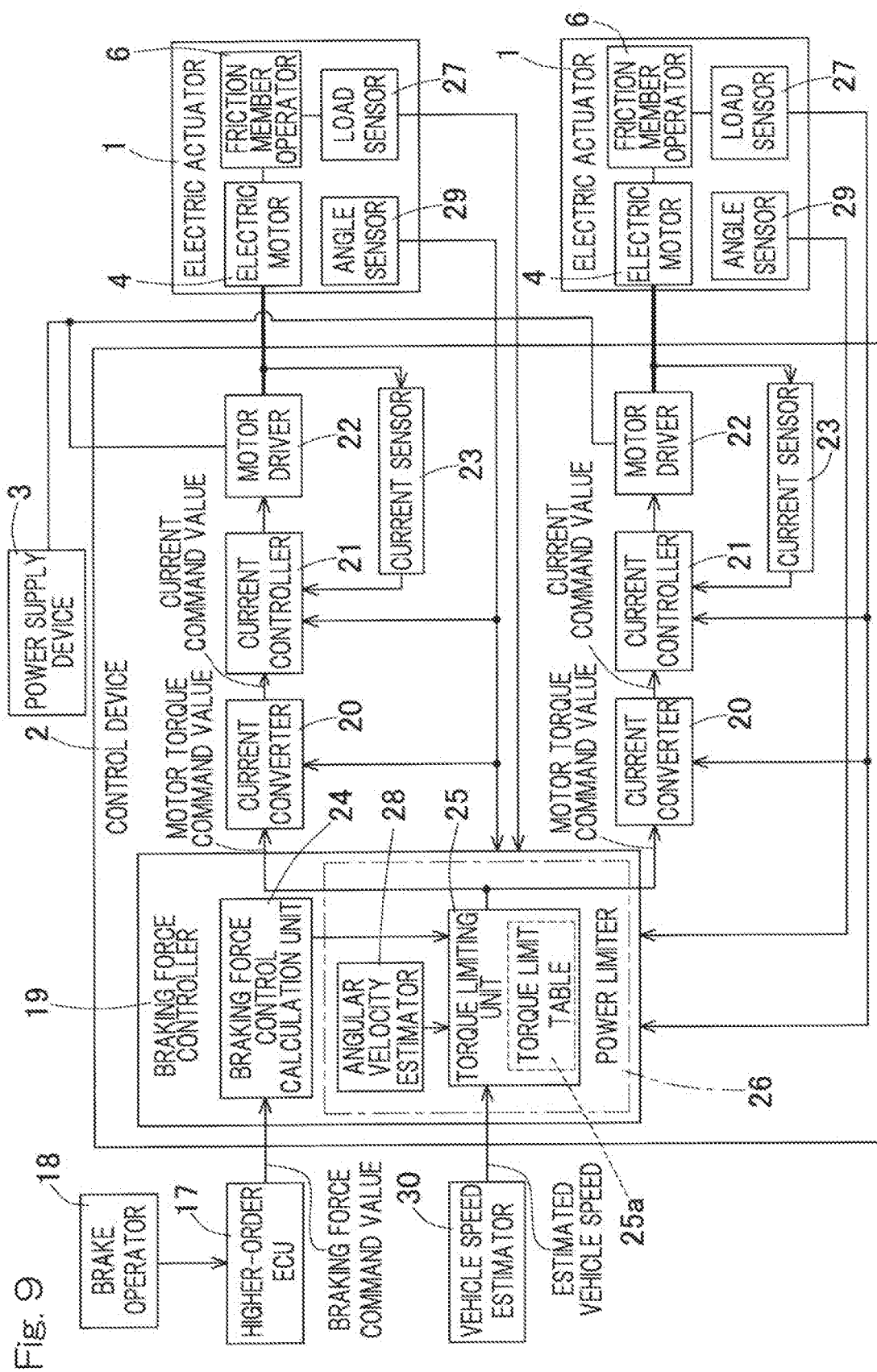
FIG. 9 is a block diagram showing a modification of the electric brake device shown in FIG. 2.

FIG. 9 is a diagram showing a modification of the electric brake device shown in FIG. 2. As shown in FIG. 9, the controller 2 may control the operations of a plurality of the electric actuators 1. In such a case, the torque limiting unit 25 of the power limiter 26 limits the motor torque command value such that the total sum of the power consumptions of the plurality of the electric actuators 1 does not exceed a limit value. With this configuration, in such a case where any of the plurality of the electric actuators 1 does not need a large power, or in such a case where any of the plurality of the electric actuators 1 generates regenerative power, the other electric actuators 1 are allowed to operate without limiting the torque command value, and the responsiveness of the electric brake device can be exerted to the maximum extent.

Figure 10:
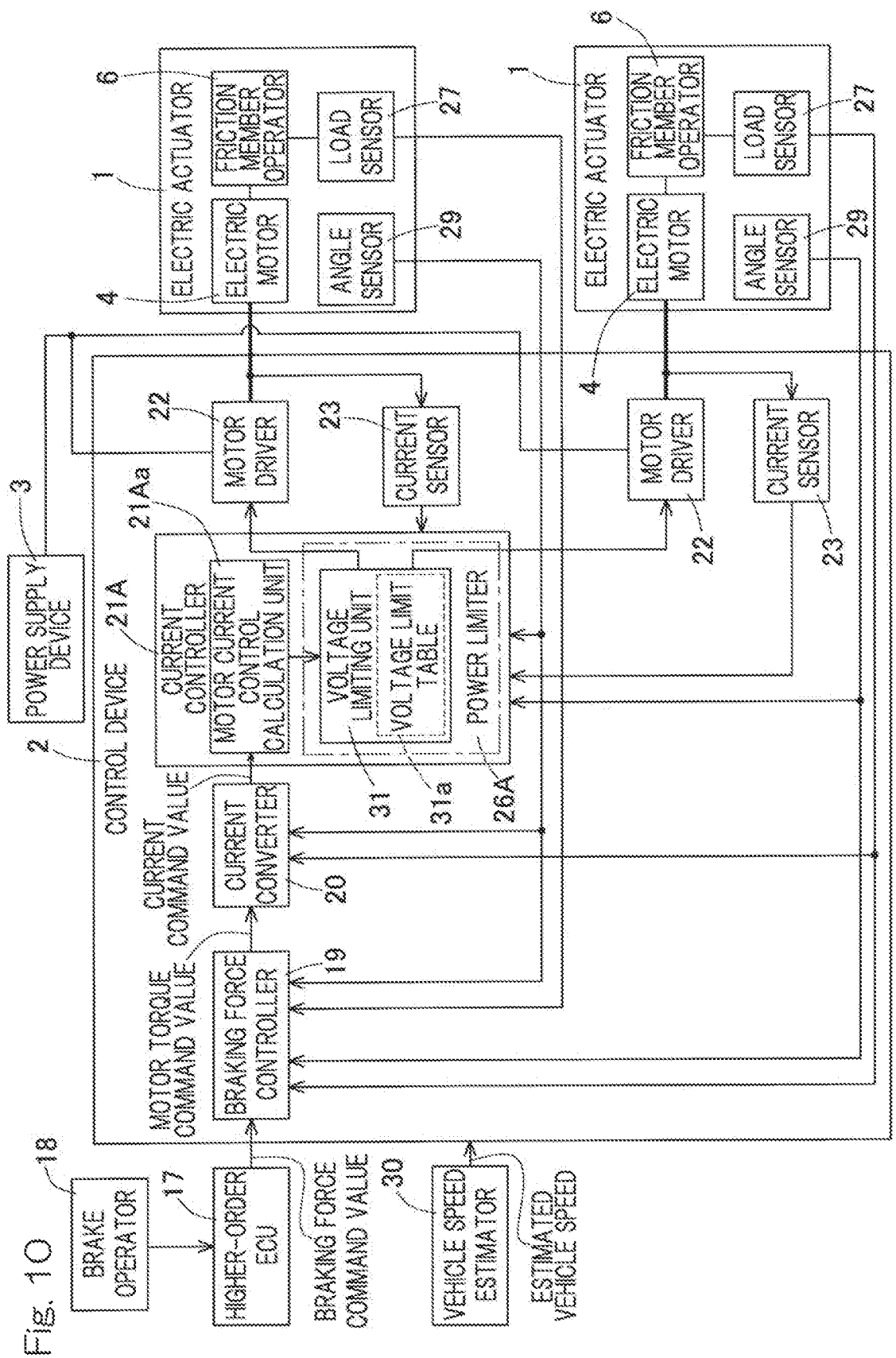
FIG. 10 is a block diagram showing a modification of the electric brake device shown in FIG. 6.

FIG. 10 is a diagram showing a modification of the electric brake device shown in FIG. 6. Similar to the controller 2 shown in FIG. 9, the controller 2 shown in FIG. 10 controls the operations of a plurality of the electric actuators 1. The voltage limiting unit 31 of the controller 2 shown in FIG. 10 limits the motor voltage such that the total sum of the power consumptions of the plurality of the electric actuators 1 does not exceed a limit value. With this configuration, in such a case where any of the plurality of the electric actuators 1 does not need a large power, or in such a case where any of the plurality of the electric actuators 1 generates regenerative power, the other electric actuators 1 are allowed to operate without limiting the torque command value, and the responsiveness of the electric brake device can be exerted to the maximum extent.

FIG. 4, FIG. 5B, and FIG. 8B each show an example in which the total sum of the maximum power consumptions is uniform. However, not limited thereto, when implementing a system configuration in actuality, at least the peak value of the total sum of the maximum power consumptions is adjusted as appropriate so as to be reduced, in consideration of influences to the braking performance. For simplification, each drawing mentioned above indicates one-to-one comparison between the electric brake device and another electrical apparatus. However, in actuality, the limiting degree of the maximum power consumption in the low-speed range of the electric brake device is determined as appropriate in consideration of a plurality of systems.

As for the power limiters 26 and 26A shown in FIG. 2 and FIG. 6, either one of them may be used, or both of them may be used in combination as appropriate. In the power limiters 26, 26A shown in FIGS. 2, 6, the process of limiting the torque or the voltage such that the limit power of the electric brake device is reduced in accordance with decrease in the absolute value of the vehicle speed may be used only when the electric motor 4 is driven (i.e. caused to do power-running operation) in a power-running range. Since the drive power in the regeneration range is charged in a battery, a capacitor, or the like of the vehicle, shortage of the power supply capacity of the vehicle is not caused. When the above-mentioned limiting according to the vehicle speed is performed only in the power-running range, the responsiveness of the electric brake device can be exerted to the maximum extent.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included therein.

REFERENCE NUMERALS

1 • • • electric actuator
2 • • • controller
4 • • • electric motor
6 • • • friction member operator
8 • • • brake rotor
9 • • • friction member
26, 26A • • • power limiter
28 • • • angular velocity estimator
30 • • • vehicle speed estimator

What is claimed is:

1. An electric brake device comprising:
an electric actuator and a controller,
the electric actuator including
   a brake rotor,
   a friction member to be brought into contact with the brake rotor,
   a friction member operator configured to bring the friction member into contact with the brake rotor, and
   an electric motor configured to drive the friction member operator,
the controller being configured to control, by controlling the electric motor, a braking force generated as a result of the contact between the friction member and the brake rotor, wherein
the electric brake device comprises a vehicle speed estimator configured to estimate a speed of a vehicle having the electric brake device mounted thereon,
the controller includes a power limiter configured to limit a power that drives the electric motor, and
when an estimated vehicle speed, which is the speed of the vehicle estimated by the vehicle speed estimator, is in a determined low-speed range, the power limiter limits the power so a maximum power consumption of the electric brake device decreases in accordance with a decrease in the estimated vehicle speed, and thereby performs a control for keeping a total sum of maximum power consumptions of electric devices mounted on the vehicle, including the electric brake device, constant over an entire vehicle speed range.

2. The electric brake device as claimed in claim 1, wherein
the controller includes an angular velocity estimator configured to estimate an angular velocity of a rotor of the electric motor, and has a function of determining, when controlling the braking force, a torque to be outputted by the electric motor or a value corresponding to the torque, and
in accordance with the estimated vehicle speed, the power limiter changes a limitation value for the torque or the value corresponding to the torque at a determined estimated angular velocity among angular velocities estimated by the angular velocity estimator.

3. The electric brake device as claimed in claim 2, wherein the electric brake device comprises a plurality of the electric actuators, the controller controls the plurality of the electric actuators, and the power limiter changes a limitation value for a total sum of the torques outputted by the electric motors or of the values corresponding to the torques.

4. The electric brake device as claimed in claim 1, wherein the controller has a function of controlling, when controlling the braking force, a voltage that is related to a current of the electric motor, and the power limiter limits the voltage such that a power derived from the current and the voltage or a value corresponding to the power does not exceed a determined limit value.

5. The electric brake device as claimed in claim 4, wherein the electric brake device comprises a plurality of the electric actuators, the controller controls the plurality of the electric actuators, and the power limiter changes a limitation value for a total sum of the powers derived from the currents and the voltages or of the values corresponding to the powers.

6. The electric brake device as claimed in claim 1, wherein the power limiter limits the power only when the electric motor performs power-running operation.

\* \* \* \* \*